Figure 1:
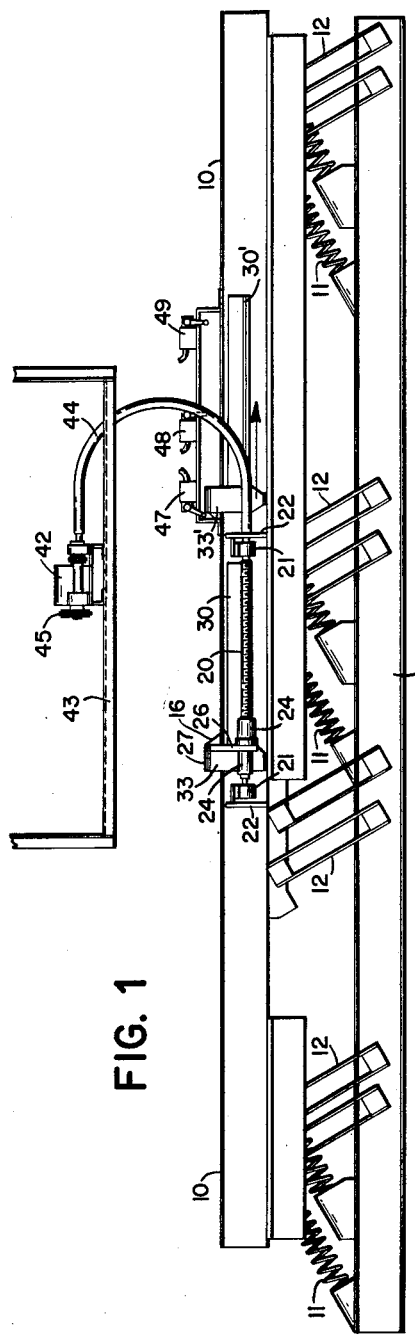

July 10, 1962 J. G. KELLY 3,043,420
AUTOMATIC SLIDING GATE FOR VIBRATING CONVEYOR
Filed April 5, 1961 3 Sheets-Sheet 1

INVENTOR
JAMES G. KELLY
BY
*Pennie, Edmonds, Morton, Barrows & Taylor*
ATTORNEY

July 10, 1962 J. G. KELLY 3,043,420
AUTOMATIC SLIDING GATE FOR VIBRATING CONVEYOR
Filed April 5, 1961 3 Sheets-Sheet 2

INVENTOR
JAMES G. KELLY
BY
ATTORNEY

July 10, 1962 J. G. KELLY 3,043,420
AUTOMATIC SLIDING GATE FOR VIBRATING CONVEYOR
Filed April 5, 1961 3 Sheets-Sheet 3

INVENTOR
JAMES G. KELLY
BY
ATTORNEY

United States Patent Office 3,043,420
Patented July 10, 1962

3,043,420
AUTOMATIC SLIDING GATE FOR
VIBRATING CONVEYOR
James G. Kelly, Richmond, Va., assignor to The American Tobacco Company, New York, N.Y., a corporation of New Jersey
Filed Apr. 5, 1961, Ser. No. 100,937
5 Claims. (Cl. 198—220)

This invention relates to sliding gates for vibrating conveyors and more particularly to a drive mechanism for such sliding gates which is adapted to position the gate automatically at any point along its path of travel while the vibrating conveyor is in operation.

Vibrating conveyors are elongated trough-like structures to which is imparted an oscillating or reciprocating simultaneous up-and-down and to-and-fro movement which causes material contained in the conveyor trough to move or flow along the trough from one end to the other. Such vibrating conveyors are used to convey material, for example tobacco, from one point to one or more other points along the length of the conveyor. When the material in the conveyor is to be delivered to more than one point along the length of the conveyor the conveyor trough is provided with one or more openings of appropriate size through which any desired portion of the material flowing along the conveyor can fall for delivery to some subsequent processing operation, for example, to a cigarette-making machine. Furthermore, in order to control the flow of material through the openings in the conveyor trough, these openings are advantageously provided with sliding gates which can be moved by the operator of the conveyor to close or open the openings. To increase operating efficiency and to avoid the necessity for shutting down the conveyor in order to adjust the positions of the sliding gates, it would be desirable to provide some mechanism by which the position of the sliding gates can be adjusted while the conveyor is in operation. However, attempts in the past to mechanize and automate the sliding gates of vibrating conveyors have not met with success due to the inability of such mechanisms heretofore employed to withstand the violent vibration to which they are subjected when the conveyor is in operation.

I have now developed a drive mechanism for a sliding gate that is adapted to position the gate at any point along its path of travel while the vibrating conveyor is in operation, the gate positioning apparatus being uniquely designed to withstand without damage or disruption the violent vibration to which it is subjected and further being adapted for automatic operation in conjunction with the operation of other process equipment. My new automatic sliding gate mechanism comprises, in combination with a vibrating conveyor having at least one material discharge opening formed in the conveyor trough, a sliding gate positioned in said trough adjacent each of said openings and movable longitudinally between predetermined limits along said conveyor trough to open and close off said material discharge opening in said trough, and means for moving said sliding gate longitudinally along said trough. The drive mechanism for the sliding gate comprises a pair of longitudinally disposed screw shafts one of which is rotatably mounted on each side of the conveyor trough, a pair of ball nuts on each screw shaft, a nut preloading spring connected to the two ball nuts on each screw shaft and urging the balls of the nuts into contact with opposite sides of the groove in the screw shaft, and a support bracket connecting each pair of preloaded ball nuts to the sliding gate of the conveyor. A pair of longitudinally disposed horizontal wheel tracks are mounted one on each side of the conveyor trough adjacent each of the aforesaid screw shafts, and a pair of rollers are mounted on each of the aforesaid support brackets so that one roller of the pair is in contact with the upper surface and the other roller is in contact with the under surface of the adjacent horizontal track. Roller preloading springs are connected to each of the rollers and urge each roller into contact with the aforesaid adjacent horizontal tracks. Prime mover means are connected to each of the aforesaid screw shafts in order to rotate the screw shafts in unison and thereby move the sliding gate between the aforementioned predetermined limits of travel. The prime mover means advantageously is mounted on a stationary structure adjacent the vibrating conveyor and is connected to each of the screw shafts by means of flexible shafts. In addition, the conveyor trough is advantageously provided with two or more switches adapted to be operated by the sliding gate as it moves, the switches being connected to the prime mover means and being positioned on the conveyor trough so as to shut off the prime mover when the sliding gate reaches its predetermined limits of travel or any predetermined point therebetween.

Figure 4:
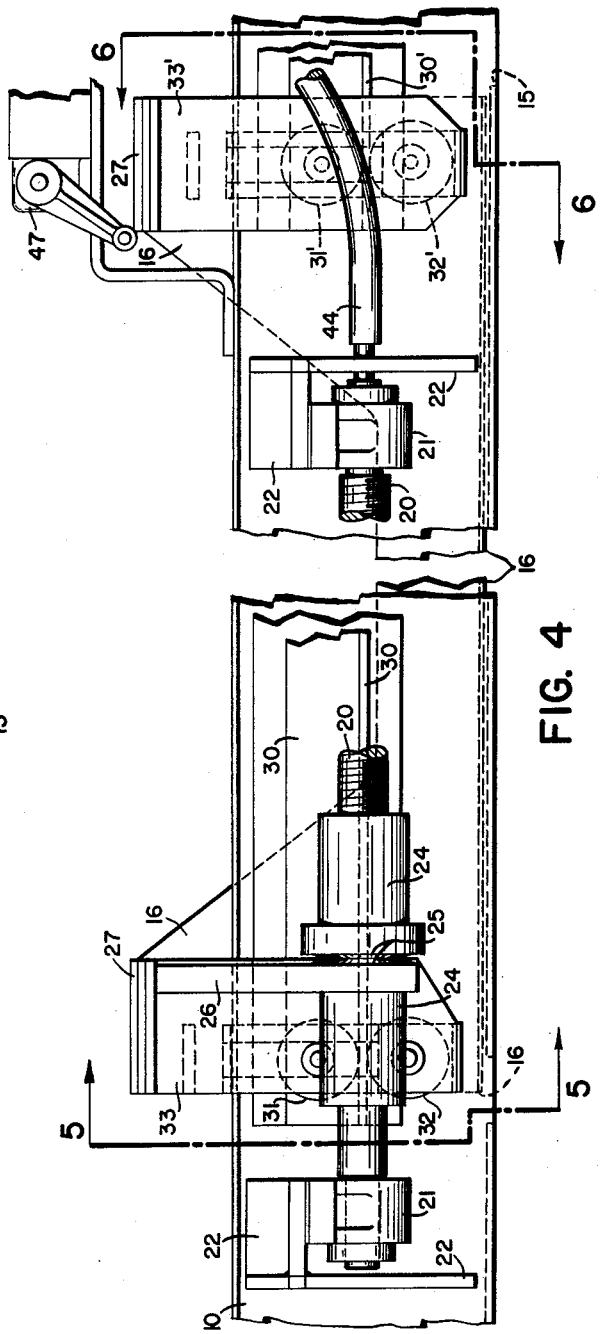
Figure 2:
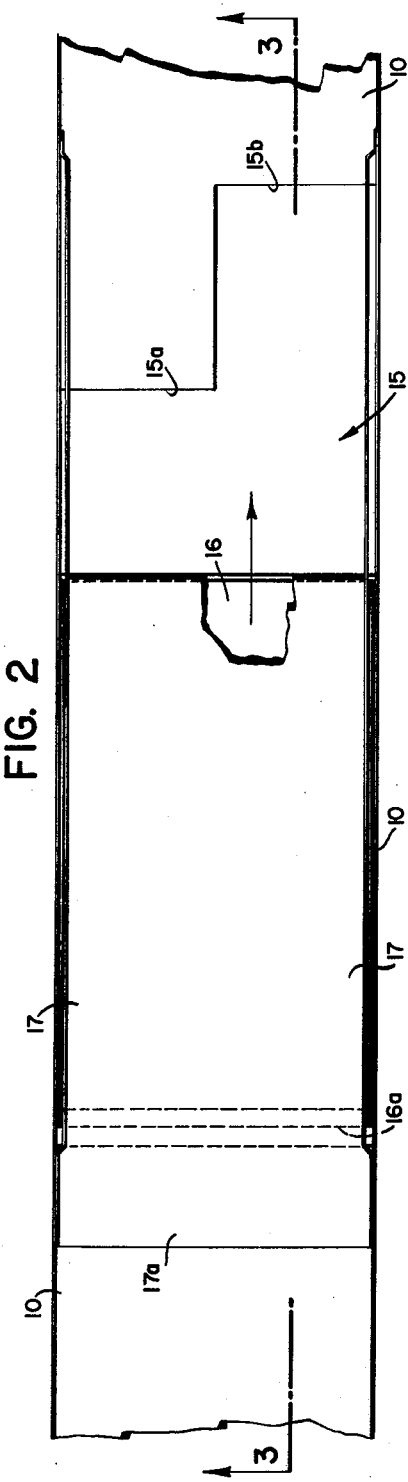
Figure 3:
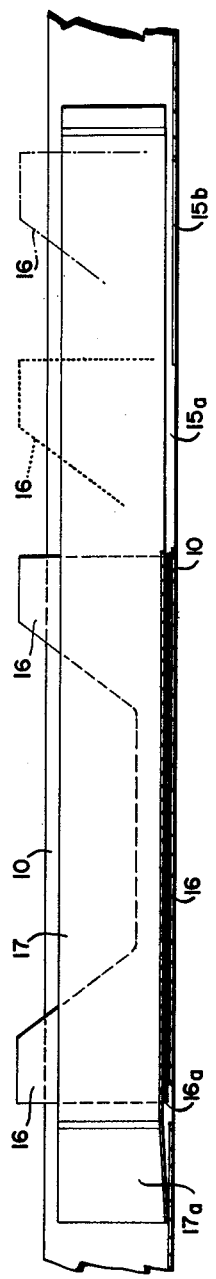
Figure 6:
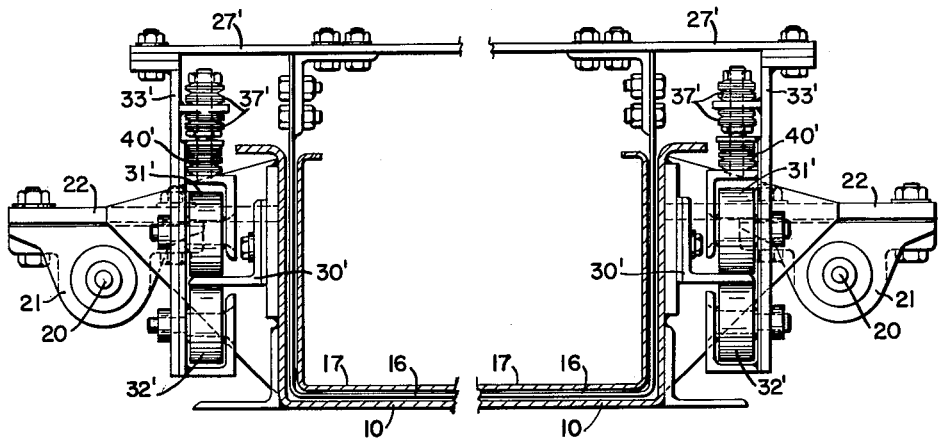
Figure 5:
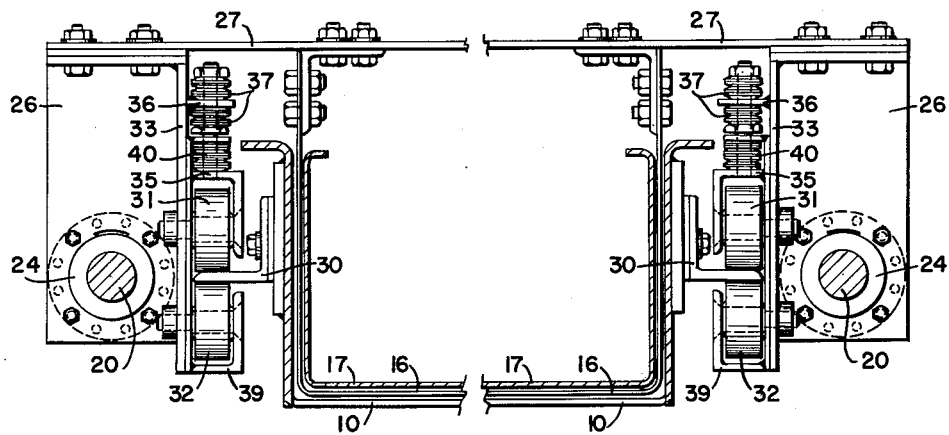

The structure of my automatic sliding gate for vibrating conveyors will be better understood from the following description in conjunction with the accompanying drawings of which FIG. 1 is a side elevation of a vibrating conveyor equipped with my new sliding gate mechanism, FIG. 2 is a partial plan view of the conveyor trough of the vibrating conveyor of FIG. 1 showing the special discharge opening in the conveyor trough and the sliding gate cooperating therewith, FIG. 3 is a side elevation of the conveyor trough of FIG. 2 showing the sliding gate in its fully open, partly open and fully closed positions, FIG. 4 is an enlarged fragmentary side elevation of the drive mechansim for the sliding gate of FIG. 1, FIG. 5 is a sectional view along lines 5—5 of FIG. 4, FIG. 6 is a sectional view along lines 6—6 of FIG. 4.

As shown best in FIG. 1 the vibrating conveyor in conjunction with which my new automatic sliding gate is used comprises a trough-like main conveyor pan 10 mounted on a mechanism adapted to impart a vibrating motion to the conveyor pan or trough. In the embodiment shown the trough 10 is mounted on a plurality of parallel spring members 11 disposed at an acute angle to horizontal as indicated in the drawing and on a plurality of parallel link members 12 pivotally connecting the conveyor pan or trough 10 to the foundation structure 13 as also indicated in the drawing. Movement of the conveyor trough 10 longitudinally against the compression of the springs 11 followed by release of the conveyor trough repeated at rapid intervals imparts an oscillating or reciprocating simultaneous to-and-fro and up-and-down motion of the conveyor trough which causes any material contained in the trough 10 to move or flow longitudinally along the length of the pan or trough from one end of the conveyor to the other.

As shown best in FIG. 2 the conveyor pan or trough 10 is formed with one or more openings 15 through which the material carried by the trough can fall for delivery to some subsequent material processing operation. A sliding gate 16 is disposed adjacent each opening 15 in the trough 10, the gate 16 being adapted to move longitudinally along the trough between predetermined limits so as to open up or close off the discharge opening in the conveyor trough. The sliding gate 16 fits snugly inside the conveyor pan or trough 10 and slides smoothly along the inner surface thereof. Moreover, as shown in FIGS. 2 and 3 the conveyor trough is advantageously provided with an inner pan 17 that fits snugly over the forward or upstream portion of the sliding gate 16, the forward or upstream end 17a of the inner pan 17 being tightly secured to the inner surface of the conveyor trough 10 in order to prevent material flowing along the trough from getting caught underneath the leading or forward edge 16a of the sliding gate 16.

The discharge opening 15 in a conventional vibrating conveyor trough ordinarily extends the full width of the trough so that when the sliding gate 16 is in its "open" position all material flowing along the trough will be discharged therefrom through the opening. However, in applicant's improved vibrating conveyor shown in the drawing the opening 15 and sliding gate 16 are uniquely designed so that by appropriate positioning of the gate all or none or any desired part of the material flowing along the conveyor trough 10 will be discharged through the opening, any material not being discharged through the opening continuing to flow along the vibrating conveyor to another discharge opening positioned downstream in the conveyor trough or in the absence of such an opening to the end of the trough itself. Thus, in the embodiment shown in FIG. 2, the discharge opening 15 advantageously has an irregular (e.g. L-shaped) configuration, one leg 15a of the opening extending across the full width of the conveyor trough and the other leg 15b of the opening extending only partway (e.g. half way) across the conveyor trough. As a result, when the sliding gate 16 is in its fully opened position as shown by solid lines in FIGS. 2 and 3 all of the material flowing along the trough 10 will fall through the long leg 15a of the discharge opening, when the sliding gate 16 is in its partly open position as indicated by dotted lines in FIG. 3 a predetermined portion (e.g. one-half) of the material flowing along the trough 10 will fall through the short leg 15b of the discharge opening and the balance of the material will continue to flow along the trough to some subsequent discharge point thereon, and when the sliding gate is in its fully closed position as indicated by dot-dash lines in FIG. 3 none of the material will fall through the discharge opening but all of it will continue to flow along the trough to some subsequent discharge point. The discharge opening 15 can have any desired configuration in order to provide for the discharge of any desired portion of the material flowing along the trough through the opening. Thus, the down stream edge of the discharge opening 15 can extend across the width of the conveyor trough 10 at an angle of, say, 45° so that by appropriate positioning of the sliding gate 16 any desired portion of the material flowing along the trough can be discharged through the discharge opening.

As shown best in FIGS. 1 and 4 the drive mechanism for positioning the sliding gate 16 comprises a pair of screw shafts 20 one of which is rotatably mounted by means of the pillow blocks 21 and pillow block brackets 22 on each side of the conveyor trough 10. A pair of ball nuts 24 is positioned on each screw shaft 20, and a nut preloading spring 25 is connected to the two nuts on each shaft whereby the balls of the nuts are urged into contact with opposite surfaces of the grooves in the screw shaft 20 on which the nuts are threaded. The nut preloading spring 25 is advantageously of the annular dished type which is positioned between the closely spaced ball nuts 24 of each pair of nuts and is connected thereto by means of bolts or the like. As indicated, the screw shaft and ball nuts are of the ballbearing type in which the facing surfaces of the shaft and nuts are formed with helical grooves having a semi-circular cross section adapted to receive a helical array of metal balls or ballbearings. The pair of ball nuts 24 on each screw shaft 20 is connected to the sliding gate 16 by means of a nut support bracket 26 and a cross member 27 so that rotation of the two screw shafts will cause the ball nuts and the sliding gate to move longitudinally with respect to the conveyor trough 10 and thereby cover or uncover the associated discharge opening 15 in the trough 10. The firm pressure of the two spring loaded ball nuts 24 on opposite surfaces of the grooves in the screw shaft 20 on which they are threaded effectively eliminates horizontal hammering of the sliding gate 16 and the associated structural members due to the violent to-and-fro motion of the vibrating conveyor.

Means are also provided to eliminate or minimize the vertical hammering of the ball nuts 24 on the screw shaft 20 due to the violent up-and-down motion of the vibrating conveyor and also to support the weight of the sliding gate 16 and associated parts. Thus, as shown best in FIGS. 4 and 5, a longitudinally disposed horizontal track 30 is mounted on each side of the conveyor trough 10 adjacent the screw shaft 20, and a pair of wheels or rollers 31 and 32 are rotatably mounted on a roller support bracket 33 so that one roller 31 is in rolling contact with the upper surface of the horizontal track 30 and the other roller 32 is in rolling contact with the under surface of the horizontal track. The roller support bracket 33 (which advantageously is secured to or forms a part of the nut support bracket 26) is connected to the sliding gate 16 by means of the cross member 27 so that the weight of the sliding gate, cross member, support brackets and rollers is very largely borne by the upper roller 31 riding on the upper surface of the horizontal track 30. Roller preloading springs are connected to the rollers 31 and 32 in such a way as to urge the rollers firmly into contact with the adjacent surfaces of the horizontal track 30. In the embodiment shown in the drawing the upper roller 31 is journalled in an upper roller mounting fixture or gib 35 which is secured to a lug 36 projecting from the roller support bracket 33. Upper roller mounting springs 37 disposed on either side of the lug 36 provide a firm but resilient connection between the upper roller gib 35 and the support bracket 33. The lower roller 32 is journalled in a lower roller mounting fixture or gib 39 which is slidably mounted on the roller support bracket 33 and is connected by means of the roller preloading springs 40 to the upper roller gib 35. As shown, the upper roller mounting springs 37 and the roller preloading springs 40 are also advantageously of the annular dished type such as that employed to preload the ball nuts 24, although of course other types of compression or tension springs can be employed.

The combination of the horizontal track 30 and the two spring-loaded rollers 31 and 32 effectively prevents vertical hammering of the sliding gate and associated structural members (e.g. the nuts and shaft) immediately adjacent the rollers. Furthermore, in order to prevent vertical hammering of the sliding gate at other points along its length, and also to support the weight thereat, one or more additional horizontal tracks 30' and spring-loaded rollers 31' and 32' identical in all essential respects with the horizontal track 30 and preloaded rollers 31 and 32 previously described are advantageously mounted on the conveyor trough 10 and are connected to the sliding gate 16 as shown best in FIG. 5 of the drawings.

In order to move the sliding gate 16 longitudinally back and forth in the conveyor trough 10 it is necessary to rotate the screw shafts 20 in unison, and prime mover means 42 connected to the screw shafts is provided for this purpose. The prime mover 42 is advantageously mounted on a stationary support 43 located apart from the vibrating conveyor to protect the prime mover from damage caused by the violent vibration of the conveyor, the prime mover being connected to each screw shaft 20 by means of flexible drive shafts 44. For example, in a typical installation shown in FIG. 1 an electric motor 42 is mounted on the stationary support 43 and is connected by means of a chain and sprocket drive 45 to a pair of flexible drive shafts 44 of conventional design each of which is connected to one of the screw shafts 20 on the vibrating conveyor. Furthermore, in order to limit the longitudinal travel of the sliding gate 16 within predetermined limits, limit switches 47 and 48 connected to the prime mover 42 are advantageously mounted on the vibrating conveyor in a position to be operated by one or the other of the support brackets 33 or 33' when the sliding gate has reached one of its predetermined limits of travel. Moreover, in addition to limit switches at each end of the path of travel of the sliding gate, one or more switches 49 can be positioned at one or more intermediate points along the path of travel to halt the longitudinal movement of the sliding gate 16 when the gate reaches this point or position along its path of travel. Thus, the accurate positioning of the sliding gate at any point along its path of travel between the aforesaid predetermined limits can be automatically controlled by conventional mechanical or electrical circuitry.

As previously pointed out, the conveyor trough 10 of the vibrating conveyor is advantageously provided with an irregular (e.g., L-shaped) discharge opening 15 which is adapted to discharge all or none or any predetermined portion (e.g. one-half) of the material flowing along the conveyor depending on the position of the sliding gate 16 with respect thereto. Furthermore, the accurate positioning of the sliding gate 16 with respect to the discharge opening 15 is advantageously controlled by means of the aforementioned limit switches 47, 48 and 49 which shut off the electric motor 42 and thus stop the longitudinal movement of the sliding gate at any of its predetermined positions (e.g., its fully open, fully closed or partly open position). Moreover, the position or sequence of positions at which the gate is stopped may be selected at will by the operator of the apparatus or by an automated conveyor control apparatus.

The vibrating conveyor of my invention is not only adapted to deliver any desired portion of the material carried by the conveyor to any desired number of discharge points along the length of the conveyor through an appropriately positioned discharge opening 15 and sliding gate 16 of the type described herein, but in addition the drive mechanism for the sliding gate 16 is so designed and constructed that it will withstand the destructive effect of the violent vibration to which it is subjected when the conveyor is in operation. That is to say, the preloading of the ball nuts 24 by means of the preloading springs 25 so that the ball nuts of each pair of nuts bear firmly against opposite sides of the grooves formed in the screw shafts 20, and the preloading of the rollers 31 and 32 by means of the pre-loading springs 40 so that the rollers bear firmly against the opposite surfaces of the horizontal track 30, together prevent destructive hammering of the ball nuts 24 against the threads of the screw shaft 20. As a result, the drive mechanism for the sliding gate 16 will continue to function in the manner described so as to accurately position the sliding gate with respect to the discharge opening for a far longer period of time than any equivalent mechanism heretofore known.

From the foregoing description of my new vibrating conveyor structure, it will be seen that I have made an important contribution to the art to which my invention relates.

I claim:

1. A vibrating conveyor having at least one material discharge opening formed in the conveyor trough, a sliding gate positioned in said trough adjacent each of said openings and movable longitudinally along said trough between predetermined limits of travel to close off and to open up said discharge opening, a pair of longitudinally disposed screw shafts one of which is rotatably mounted on each side of the conveyor trough, a pair of ball nuts on each screw shaft, a nut preloading spring connected to the two ball nuts on each screw shaft and urging the balls of the nuts into contact with opposite sides of the grooves in the screw shaft, a support bracket connecting each pair of preloaded ball nuts to the sliding gate, a pair of longitudinally disposed horizontal tracks one of which is mounted on each side of the conveyor trough adjacent each of said screw shafts, a pair of rollers mounted on each support bracket one of which rollers is in contact with the upper surface and the other of which rollers is in contact with the undersurface of the adjacent horizontal track, roller preloading springs connected to each roller and urging each roller into contact with said horizontal track, and prime mover means connected to each of said screw shafts for rotating said screw shafts and thereby moving said sliding gate between said predetermined limits of travel.

2. A vibrating conveyor having at least one material discharge opening formed in the conveyor trough, a sliding gate positioned in said trough adjacent each of said openings and movable longitudinally along said trough between predetermined limits of travel to close off and to open up said discharge opening, a pair of longitudinally disposed screw shafts one of which is rotatably mounted on each side of the conveyor trough, a pair of ball nuts on each screw shaft, a nut preloading spring connected to the two ball nuts on each screw shaft and urging the balls of the nuts into contact with opposite sides of the grooves in the screw shaft, a support bracket connecting each pair of preloaded ball nuts to the sliding gate, a pair of longitudinally disposed horizontal tracks one of which is mounted on each side of the conveyor trough adjacent each of said screw shafts, a pair of rollers mounted on each support bracket one of which rollers is in contact with the upper surface and the other of which rollers is in contact with the undersurface of the adjacent horizontal track, roller preloading springs connected to each roller and urging each roller into contact with said horizontal track, prime mover means connected to each of said screw shafts for rotating said screw shafts and thereby moving said sliding gate between said predetermined limits of travel, and limit switches connected to said prime mover means and mounted on said conveyor trough in position to be actuated by said sliding gate and thereby shut off said prime mover means when said sliding gate reaches its predetermined limits of travel.

3. A vibrating conveyor having at least one irregularly shaped material discharge opening formed in the conveyor trough one portion of which discharge opening extends completely across and another portion of which discharge opening extends part way across said conveyor trough, a sliding gate positioned in said trough adjacent each of said openings and movable longitudinally along said trough between predetermined limits of travel to close off, to partly open and to fully open up said discharge opening, a pair of longitudinally disposed screw shafts one of which is rotatably mounted on each side of the conveyor trough, a pair of ball nuts on each screw shaft, a nut preloading spring connected to the two ball nuts on each screw shaft and urging the balls of the nuts into contact with opposite sides of the grooves in the screw shaft, a support bracket connecting each pair of preloaded ball nuts to the sliding gate, a pair of longitudinally disposed horizontal tracks one of which is mounted on each side of the conveyor trough adjacent each of said screw shafts, a pair of rollers mounted on each support bracket one of which rollers is in contact with the upper surface and the other of which rollers is in contact with the under surface of the adjacent horizontal track, roller preloading springs connected to each roller and urging each roller into contact with said horizontal track, prime mover means connected to each of said screw shafts for rotating said screw shafts and thereby moving said sliding gate between said predetermined limits of travel, and limit switches connected to said prime mover means and mounted on said conveyor trough in position to be actuated by said sliding gate when said gate reaches its fully closed, partly open and fully open positions within its predetermined limits of travel.

4. A vibrating conveyor having at least one L-shaped material discharge opening formed in the conveyor trough one leg of which L-shaped opening extends completely across and the other leg of which L-shaped opening extends part way across said conveyor trough, a sliding gate positioned in said trough adjacent each of said openings and movable longitudinally along said trough between predetermined limits of travel to close off, to partly open and to fully open up said discharge opening, a pair of longitudinally disposed screw shafts one of which is rotatably mounted on each side of the conveyor trough, a pair of ball nuts on each screw shaft, a nut preloading spring connected to the two ball nuts on each screw shaft and urging the balls of the nuts into contact with opposite sides of the grooves in the screw shaft, a support bracket connecting each pair of preloaded ball nuts to the sliding gate, a pair of longitudinally disposed horizontal tracks one of which is mounted on each side of the conveyor trough adjacent each of said screw shafts, a pair of rollers mounted on each support bracket one of which rollers is in contact with the upper surface and the other of which rollers is in contact with the under surface of the adjacent horizontal track, roller preloading springs connected to each roller and urging each roller into contact with said horizontal track, electric motor means connected to each of said screw shafts for rotating said screw shafts and thereby moving said sliding gate between said predetermined limits of travel, and electric limit switches connected to said motor means and mounted on said conveyor trough in position to be actuated by said sliding gate when said gate reaches its fully closed, partly open and fully open positions within its predetermined limits of travel.

5. A drive mechanism for a sliding gate on a vibrating conveyor having a material discharge opening formed in the conveyor trough which comprises a pair of longitudinally disposed screw shafts one of which is rotatably mounted on each side of the conveyor trough, a pair of ball nuts on each screw shaft, a nut preloading spring connected to the two ball nuts on each screw shaft and urging the balls of the nuts into contact with opposite sides of the grooves in the screw shaft, a support bracket connecting each pair of preloaded screw nuts to the sliding gate, a pair of longitudinally disposed horizontal wheel tracks one of which is mounted on each side of the conveyor trough adjacent each of said screw shafts, a pair of rollers mounted on each support bracket one of which rollers is in contact with the upper surface and the other of which rollers is in contact with the under surface of the adjacent horizontal track, roller preloading springs connected to each roller and urging each roller into contact with said horizontal track, and prime mover means connected to each of said screw shafts for rotating said screw shafts and thereby moving said sliding gate longitudinally along said conveyor trough.

References Cited in the file of this patent
UNITED STATES PATENTS
2,642,980     Soucek _____ June 23, 1953